United States Patent Office 3,459,684
Patented Aug. 5, 1969

3,459,684
POLYMERIZATION OF 1-AZABICYCLOALKANES
Donald Richard Wilson, Wilmington, Del., assignor to E. I. du Pont de Nemours and Company, Wilmington, Del., a corporation of Delaware
No Drawing. Filed Jan. 24, 1967, Ser. No. 611,231
Int. Cl. C08g 33/08
U.S. Cl. 260—2
5 Claims

ABSTRACT OF THE DISCLOSURE

Catalytic polymerization of 1-azabicycloalkanes containing from 6 to 8 carbon atoms and having the formula

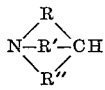

where R, R' and R" are each divalent alkylene radicals of the group consisting of methylene, ethylene and trimethylene and wherein one of the three carbon atoms adjacent the bridgehead carbon may bear a hydroxyl group yields novel polyamines useful in films, adhesives, finishes and as additives to polymers.

BACKGROUND

U.S. Patent No. 3,165,482 dated Jan. 12, 1965, describes polymers having ring structures along the chain, each ring containing either 2 bridge head nitrogen atoms or 2 bridgehead carbon atoms. Other prior art, J.A.C.S. vol. 82, p. 2609 (1960), describes the synthesis and homopolymerization of certain 1-azabicyclo-[4.2.0] octanes. U.S. Patent 2,932,650 to Cope et al. states that 2,6-diazabicyclo [3.3.0] octane may be catalytically converted to polymers. U.S. Patent 2,692,243 to Swarc may also be of interest.

BRIEF SUMMARY OF THE INVENTION

This invention relates to novel polymeric amines and methods of preparing them from mono-azabicycloalkanes containing the nitrogen atom at a bridgehead position.

The invention provides novel polyamines having the following recurring structural units:

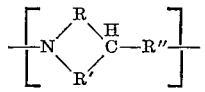

where R, R' and R" are divalent alkalene radicals of the group consisting of methylene, ethylene and trimethylene each repeating unit containing between six and eight carbon atoms. The polymers are prepared by the polymerization of certain 1-azabicycloalkanes at elevated temperatures and in the presence of certain catalysts. The polymers have been used to enhance dyeability of other polymers and have been cast into films.

DETAILED DESCRIPTION

The novel polymers of the present invention have the following repeating structural units:

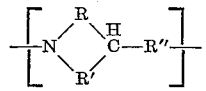

where R, R' and R" are divalent alkylene radicals selected from the group consisting of methylene, ethylene and trimethylene, and the repeating structural units each contain between six and eight carbon atoms. Any molecule may exhibit an ordered or random arrangement of two or three isomeric forms of the repeating structural unit characteristics of the particular polymer, the forms differing only in the relative positions of R, R' and R". Optionally, when R, R' and R" represent ethylene, one of the hydrogens on any one of the three carbon atoms adjacent to the tertiary carbon may be replaced by a hydroxy radical.

The polymers with which the present invention is, in part, concerned are obtained by polymerization of 1-azabicycloalkanes containing from 6 to 8 carbon atoms and having the general formula:

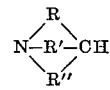

where R, R' and R" are chosen from the group of divalent alkylene radicals consisting of methylene, ethylene and trimethylene. Where R, R' and R" represent ethylene, a hydrogen on one of the three carbon atoms adjacent to the bridgehead carbon may be replaced by a hydroxyl radical.

The following bicyclic amines are included within the scope of the present invention:

1-azabicyclo[2.2.1] heptane
1-azabicyclo[2.2.2] octane (quinuclidine)
1-acabicyclo[3.1.1] heptane
1-azabicyclo[3.2.1] octane
1-azabicyclo[3.2.2] nonane
1-azabicyclo[3.3.1] nonane (Isograntanine)
3-hydroxy-1-azabicyclo[2.2.2] octane (3-quinuclidinol)

The preferred monomers comprise quinclidine, 3-quinuclidinol, isogranatanine and 1-azabicyclo [2.2.1] heptane.

The polymerization reaction involves breaking one of the three nitrogen-carbon bonds, which are substantially equivalent in monomers of the present invention. The lack of selectivity in bond breaking result in a polymer molecule containing an ordered or random arrangement of isomeric repeating structural units which differ only in the relative positions of R, R' and R".

This invention is in part concerned with a preferred method for preparing the novel polyamines from 1-azabicycloalkanes containing from 6 to 8 carbon atoms, comprising heating the monomer 1 to 120 hours at 100–300° C. in the presence of 0.01 to 1.0 mole percent of an organic sulfonic acid, sulfonic acid ester or an amine salt of the acid or ester, either in vacuo or in the inert atmosphere. Preferred catalysts for use in the present invention are salts prepared by reacting an aromatic sulfonic acid or ester thereof with an equimolar amount of a 1-azabicycloalkane. Preferred amines are 1-azabicyclo [2.2.2] octane and 1-azabicyclo-[2.2.1] hepane. The catalysts should be in the anhydrous state, as water adversely affects the polymerization reaction.

When the bicyclic amine portion of the catalyst differs from the monomer the former may be incorporated into the polymer chain, resulting in a miner amount of a random copolymer. As the catalyst concentration does not exceed 1 mole percent in the present invention, the physical and chemical properties of the product will be substantially identical to those of the major homopolymer fraction.

Many of the novel polyamines of the present invention exhibit melting points above 250° C., making them suitable for high temperature applications.

The preferred quinuclidine and 3-hydroxyquinuclidine monomers produce crystalline polymers, solutions of which are capable of being formed into films or filaments using known evaporation or coagulation techniques. Molded shaped objects can be obtained by in-situ polymerization of the monomer.

The ends of the polymer chains are derived from the catalyst, and may be for example, hydrogen and sulfur-containing groups or unsaturated alkyl groups.

The following examples illustrate this invention, but should not be construed as limiting it in any respect.

All of the inherent viscosities in the present specification and claims are determined in accordance with the following formula:

$$\eta\ inh = \frac{ln\ \eta\ rel}{c}$$

The relative viscosity ($\eta_{rel}$) may be determined by dividing the flow time in a capillary viscometer of a dilute solution of the polymer by the flow time for the pure solvent. The concentration ($c$) is generally 0.5 gram of polymer per 100 ml. of solution, and the measurements are made at a temperature of 30° C. These inherent viscosities are, in every case, measured in meta-cresol. Polymers of the invention have an inherent viscosity of at least about 0.1 when measured in this manner.

EXAMPLE I

This example describes the syntheses employed in preparing two preferred catalysts and two of the preferred monomers of the present invention.

1-azabicyclo (2.2.1) heptane is described by Lukes et al. COLL Czech Chem COMM vol. 24, p. 212 (1959). It was prepared as follows:

200 g. (1.83 moles) of 4-pyridylcarbinol was hydrogenated in 300 ml. of water over 10 g. of 5% ruthenium on carbon at 90° C. and 1500 p.s.i.g.

The filtered product was concentrated on a rotary evaporator and dried by azeotropic distillation with three 200 ml. portions of chloroform. Distillation through a modified Claisen head gave 146 g. (69% yield) of 4-piperidylcarbinol, B.P. 132–135° C. (15 mm.), M.P. 60–61° C.

Into a flame dried 5–1 three-neck flask equipped with a condenser, drying tube, addition funnel, gas inlet tube and magnetic stirrer were placed 147 g. (1.28 moles) of 4-piperidylcarbinol and 2.25 1. of chloroform. With cooling and stirring the solution was saturated with anhydrous hydrogen chloride and then the gas inlet tube was removed and the solution was refluxed for 10 min. With cooling in an ice bath 350 g. (3.0 moles) of chlorosulfonic acid dissolved in 250 ml. of chloroform were slowly added to the stirred reaction mixture. After refluxing for 2.5 hrs., the mixture was concentrated to a viscous residue on a steam bath under reduced pressure. The residue was dissolved in 1 1. of cold water and added to a cold solution of 900 g. potassium hydroxide dissolved in 900 ml. of water and steam distilled. The basic distillate, about 1500 ml., was collected and neutralized with 225 ml. (1.35 equiv.) of 6 N sulfuric acid. The neutralized solution was concentrated to about 500 ml. of a rotary evaporator and then added to a cold solution of 240 g. of sodium hydroxide in 500 ml. of water. With stirring, 35 g. (0.20 mole) of benzenesulfonyl chloride were added. After stirring overnight, the mixture was steam distilled and the basic distillate was saturated with potassium hydroxide and extracted twice with ether. The combined ether extracts were dried over potassium hydroxide pellts, filtered and concentrated. The concentrate was distilled from sodium to give 88.1 g. (71%) of product, B.P. 123–125° C., M.P. 72–75° C.

N - methyl - 1 - azabicyclo[2.2.1]heptylium p-toluenesulfonate was prepared following the synthesis of Henecka et al. [Angew. Chem., 72, 960 (1960)]. 3.5 g. (92% yield) of the product was obtained from 1.28 g. (0.0132 mole) of 1-azabicyclo[2.2.1]heptane and 2.52 g. (0.0135 mole) of methyl p-toluenesulfonate. The melting range of the salt was 174.5–176.5° C.

A similar procedure produced a 98% yield of N-methyl-1-azabicyclo[2.2.2]octylium p-toluenesulfonate from 2.22 g. (0.020 mole) of 1-azabicyclo[2.2.2] octane and 5.9 g. (0.032 mole) of methyl p-toluenesulfonate. After recrystallization from acetonitrile/ethyl acetate and drying over $P_2O_5$, the salt had a melting range of 162–163.5° C.

Isogranataine is described in Prelog, Heimbach and Seiworth Ber. vol. 72, p. 1319 (1939). It was prepared as follows:

A 207.6 g. (1.51 moles) sample or 3-(γ-hydroxypropyl) pyridine, B.P. 142° C. (5.0 mm.), $n_D^{24.5}$ 1.5281, was hydrogenated in 200 ml. of ethanol at 60° C. and 1800 p.s.i.g. over rhodium. The product was distilled through a modified Claisen head to give 201.0 g. (93%) of 3-(γ-hydroxypropyl)piperidine, B.P. 140° C. (8.0 mm.), $n_D^{24.8}$ 1.4887.

Isogranataine was prepared by the cyclodehydration of 183 g. (1.28 moles) of 3-(γ-hydroxypropyl)piperidine in the same manner as described above for 1-azabicyclo-[2.2.1]heptane. The steam distilled product required 55 ml. (0.33 mole) of 6 N sulfuric acid for neutralization. The steam distillate was concentrated by evaporation to about 200 ml. and then added to a cold solution of 100 g. sodium hydroxide and 700 g. water. With stirring 15 g. of benzenesulfonyl chloride were added and stirring was coninued for 4 hours. The solution was steam distilled after the addition of 50 g. additional sodium hydroxide until the distillate was neutral (about one liter). About 250 g. of potassium hydroxide was dissolved in the distillate with cooling and then the distillate was continuously extracted with ether overnight. The extract was dried over magnesium sulfate, filtered, concentrated and finally sublimed from the sodium at 25 mm. to give 30.3 g. of white crystals, M.P. 102–106° C. The sublimate was resublimed from sodium at 30 mm. to give 28.6 g. (18%) of isogranataine, M.P. 114–115° C.

EXAMPLE II

Polymerization of 1-azabicyclo[2.2.2]octane

A mixture containing 2.22 g. (0.02 mole) of 1-azabicyclo[2.2.2]octane, and 0.03 g. (1.1×10⁻⁴ mole) of N-methyl-1-azabicyclo[2.2.1]heptylium p - toluenesulfonate was placed in a 12 mm. by 220 mm. heavy walled glass tube, after which the tube was sealed in vacuo and heated for one hour in an oil bath at 250° C. The tube was allowed to cool to near room temperature and opened. The solid plug of polymer, off-white in color, was chopped up and extracted with hot chloroform. No measurable weight loss was observed following extraction. The polymer was then ground in a Wiley mill and dried at 130° C. for 24 hours in a vacuum oven equipped with a nitrogen bleed. The dried polymer weighted 1.7 g. (77% yield from monomer) and exhibited inherent viscosity ($\eta_{inh}$) of 2.48.

A clear, tough flexible film was cast from a 10% by wight hexafluoroisopropanol solution and from a 5% by weight acetic acid solution of the polymer. Films containing residual solvent were drawable. The dry film was not water sensitive as evidenced by substantially no weight gain after reflux in water for fifteen minutes.

EXAMPLE III

Polymerization of 1-azabicyclo[3.3.1]nonane

A mixture of 0.01 g. (3.5×10⁻⁵ mole) of N-methyl-1-azabicyclo[2.2.1]heptylium p-toluenesulfonate and 5.0 g. (0.040 mole) of 1-azabicyclo[3.3.1]nonane was heated in a sealed, evacuated glass tube for five days at 222° C. After cooling, the polymer was treated with ether and the remainder dissolved in chloroform. The ether and chloroform solutions were combined and concentrated to leave a viscous residue. The polymer was dried over $P_2O_5$ at 1 mm. pressure, resulting in a 2.2 g. (44% yield). The inherent viscosity was 0.56. An infrared spectrum of the polymer exhibited weak absorptions at 5.95, 6.05, 10.08, and 11.05 microns, which may be attributed to vinyl groups.

The calculated percentage by weight of nitrogen for the formula $(C_8H_{15}N)_n$ is 11.2%, which was in good agreement with analyzed values for N of 11.0 and 11.1%.

EXAMPLE IV

Polymerization of 3-quinuclidinol

Into a flame-dried heavy-walled glass tube under an atmosphere of nitrogen were placed 6.35 g. (0.050 mole) of 3-quinuclidinol and 0.030 g. ($1 \times 10^{-4}$ moles) of 1-methyl-1-azabicyclo[2.2.2]octylium p-toluenesulfonate. The tube was cooled to $-80°$ C., evacuated, sealed and placed in a refluxing vapor bath of methyl salicylate (222° C.). After several hours a solid product started to appear and the tube was left in the vapor bath for a total of 48 hours. The tube was cooled to room temperature and broken. The contents of the tube did not appear to be under pressure. A small amount of monomer had sublimed to the top of the tube and was discarded. The remaining polymer plug, varying in color from white to yellow, was chopped, ground in a Wiley mill to pass through a ten mesh screen, and then dried overnight at 110° C. in a vacuum oven with a nitrogen bleed to leave 5.0 g. (79% yield) of polymer.

$\eta_{(Inh)}$—0.48
Percent N—10.9 analyzed (theory 11.0)

Films were cast from an approximately 10% polymer solution in each of acetic acid, formic acid and meta-cresol. After drying they could not be removed from the glass plate and were readily soluble in water. The X-ray diffraction pattern of the polymer indicated a high degree of crystallinity.

EXAMPLE V

Polymerization of 1-azabicyclo[2.2.1]heptane

The waxy nature of the monomer required special handling for loading the glass tube. A special heavy-walled tube with a wide mouth top was employed. To the polymer tube were added 0.06 g. ($2.2 \times 10^{-4}$ mole) of N-methyl-1-azabicyclo[2.2.2]heptylium p-toluenesulfonate and then 3.88 g. (0.04 mole) of 1-azabicyclo[2.2.1]heptane were placed in the top of the tube under an atmosphere of nitrogen. While under a dry nitrogen atmosphere, the bottom of the tube was immersed in an ice bath and the upper portion of the tube was heated with an infrared lamp which permitted the monomer to melt and flow to the bottom of the tube. The top of the tube was broken off and the bottom of the tube was cooled to $-80°$ C. following which the tube was evacuated and sealed. The sealed tube was placed in a refluxing bath of anisole (B.P. 152° C.). After 1½ hrs. the contents of the tube were clear but noticeably viscous. After 22 hrs. the mixture was still clear but non-flowing. The tube was cooled and broken. The polymer had the consistency of a hard rubber, smelled weakly of monomer, and after removing glass fragments weighed 3.3 g. (85%). The chopped polymer was ground in a Wiley mill with Dry Ice to pass through a ten mesh screen and dried overnight at 100° C. in a vacuum oven with a nitrogen bleed to leave 2.8 g. (72% yield) of polymer. After drying the polymer was insoluble in chloroform, acetic acid, trifluoroacetic acid, and hexafluoroisopropanol, although swelling in the last three solvents was apparent. The polymer did not flow on a hot bar below 350° C.

Percent N–14.0 analyzed (theory 14.5)

The novel polyamines of the present invention can be used as desalinization membranes, ion-exchange resins, paper finishes additives to enhance the dyeability of other polymers, adhesives and solid catalysts. The following examples illustrate two specific uses:

EXAMPLE VI

Preparation of polypropylene dyeable with acid dyes

Onto a film of polypropylene [pressed on a Carver Press at 230° C. (10,000 p.s.i.)] was spread 7.2 wt. percent of poly 1-azabicyclo[3.3.1]nonane. The film was folded over several times and pressed again. Folding and pressing was repeated several times to obtain even distribution of the additive. The modified film readily absorbed dye from an acidified (pH=2.0) dye bath on reflux for two hours. The aqueous bath contained 4% based on the film weight of Color Index acid blue 25 dye. The dyed film was color-fast to a 15 min. scour in a 1% solution of sodium lauryl sulfate at 85° C. An unmodified control sample of polypropylene was found to absorb no dye.

EXAMPLE VII

Adhesive (bonding of glass)

A polymer solution prepared by dissolving 0.030 g. of poly(3-quinuclidinol) in 0.3 ml. of acetic acid was applied to the freshly broken ends of a glass rod ($6 \times 180$ mm). After two hours the ends were butted together. The initial bond was strong enough that the rod could be held horizontally by the ends without breaking. After air drying overnight followed by 24 hrs. in a vacuum oven at 100° C. (1 mm.) the bond was sufficiently strong to withstand being dropped from a height of 6 inches (15 cm.) onto a hard surface.

What is claimed is:

1. A process comprising polymerizing a 1-azabicycloalkane containing from 6 to 8 carbon atoms and having the formula

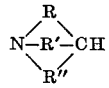

wherein R, R' and R" are each divalent alkylene radicals of the group consisting of methylene, ethylene and trimethylene and wherein one of the three carbon atoms adjacent to the bridgehead carbon may bear a hydroxyl group when R, R' and R" are ethylene, in the presence of from 0.01 to 1.0 mol percent of an aromatic sulfonic acid or ester therof with an equimolar amount of a 1-azabicycloalkane and at a temperature of from 100 to 300° C.

2. The process of claim 1 wherein the 1-azabicycloalkane to be polymerized is quinuclidine.

3. The process of claim 1 wherein the 1-azabicycloalkane to be polymerized is isogranatanine.

4. The process of claim 1 wherein the 1-azabicycloalkane to be polymerized is 3-quinuclidinol.

5. The process of claim 1 wherein the 1-azabicycloalkane to be polymerized is 1-azabicyclo[2.2.1]heptane.

References Cited

UNITED STATES PATENTS

| | | | |
|---|---|---|---|
| 3,165,482 | 1/1965 | Hall | 260—2 |
| 3,370,042 | 2/1968 | Rieger et al. | 260—67.5 |
| 3,409,564 | 11/1968 | Cislak et al. | 260—2 |

OTHER REFERENCES

Lavagnino et al., "Jour. American Chem. Soc.," vol. 82, May 1960, pp. 2609–2613.

SAMUEL H. BLECH, Primary Examiner

U.S. Cl. X.R.

156—331; 260—2, 29, 31, 33, 41, 292, 293, 294, 313, 326, 897